6716X
J. Stimpson.
Railroad Switch.
Patented Aug. 23, 1831.
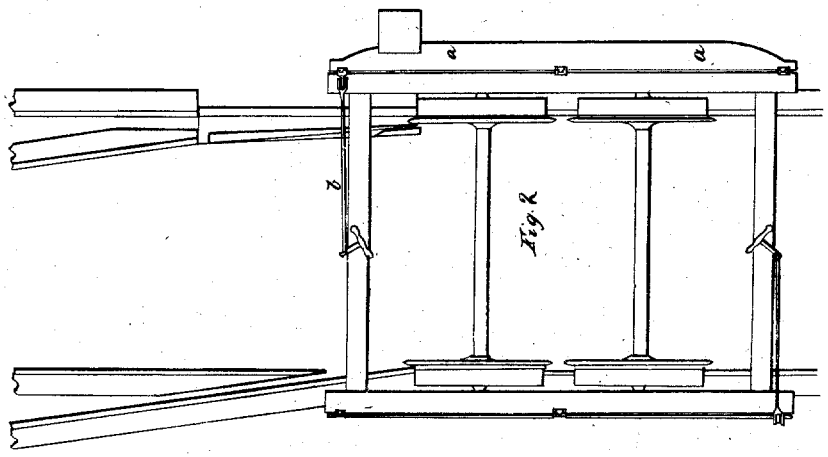
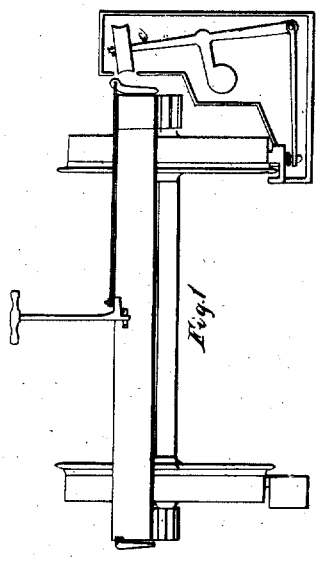
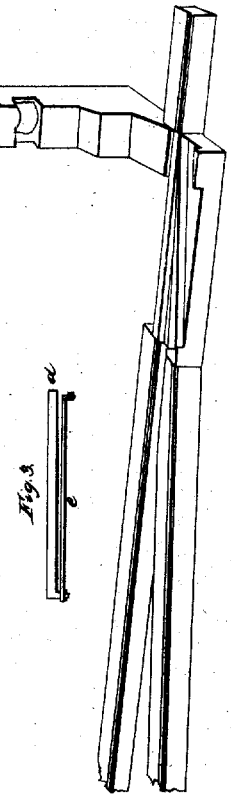
Witnesses.
J. H. Walsh
Inventor.
James Stimpson
THE GRAPHIC CO. PHOTO-LITH. 39 & 41 PARK PLACE, N.Y.

Aug 23. 1831 6716X 519

James Stimpson
Letters Patent

The Schedule referred to in these Letters Patent and making part of the same containing a description in the words of the said James Stimpson himself of his improvement in the "mode of opening and shutting switches upon Rail Roads."

To all whom these Presents shall come

Be it known that I James Stimpson of the City and County of Baltimore and State of Maryland have invented a new and useful improvement in the mode of opening and shutting switches upon Rail Roads which improvement consists in providing the means whereby the Drivers of cars or any kind of Carriages upon rail roads, or the superintendents of Locomotive Engines, can open and shut the switches to enable them to cross from one track to another, as they please without stopping or leaving their seats or stations, or requiring the assistance of any one else upon the roads; and that the following is a full and exact description of the said invention or improvement, as invented or improved by me viz I will first describe the switch in common use. that a better understanding of the improvement may be had; said switch is formed in shape like a wedge, it is of iron four feet in length, more or less, three inches wide at the heel, where it is rounded horizontally about said end, tapering down to about a quarter of an inch more or less, at the opposite end, and is about one and five eights of an inch deep more or less its whole length; the switch has a pin of considerable size, say one and a quarter of an inch diameter, more or less, fast into the heel or near the rounded end, said pin passes down through a plate of cast or other iron, which plate is the track rail upon which the rail road carriage wheels travel; the said pin passes through said plate or rail, and has a key through it to prevent its being displaced. A part of my invention or improvement is to make a square or flat tenon upon the lower end of said pin a little flush of the under side of the iron plate through which it passes, thence its whole length out having square shoulders at the termination of the rounded part, and a key hole through it near the bottom. I also propose to form a piece of iron similar to the aforesaid switch one way, but quite thin the other at the wide end of which, a square or

6716X slot hole, should be made conformable to the shape of the tenon on the aforesaid pin,
which iron should be made to fit tight and strong upon said tenon, and the key
through said pin under the last mentioned, iron, should be driven in, forcing
said iron tight up to the shoulders, in which situation said iron should lay,
under the rail or plate parallel with the switch above it and just free to move
easy under said plate or rail; said iron may be of the same length of the switch
more or less, and should have a short round tenon at the small end, which end
is opposite to the heel pin; said iron thus connected to said pin, which is fast
in the heel of the switch. I will call the switch Lever; The said switch Lever,
is thus fastened to the heel pin of the switch, for the purpose of opening and shutting
it, and it being under the iron plate on which the wheels of the carriage run. no
harm can reach it, neither stones, gravel, water or ice, if properly secured by
a boxing placed each side and below the iron plate or rail. The next article
I propose, is, that for opening and shutting the switches, by a connection between
it and the carriages, and which may be effected, in the following manner or
mode, or any other way) which may be preferred. First then; a wood or
stone post may be fixed solid in the earth, between the tracks, or connect-
ed or fastened to the track rails, or sleepers preferring the last mode as it would
be exempt from injury, by frost; at such a distance from the track rails as shall
be most convenient; with said post in the ground or on the rails may be con-
nected an upright iron shaft; its top should reach a little above the post
with a gudgeon near the top and bottom, confined in boxes or cleats, so that it
can turn round or vibrate one way or the other; at the lower end should be
fixed a shank or arm on the end of the upright post or shaft, or it may be bent
out straight at right angles with the upright, six inches, more or less, in length;
and a stud pin should be made fast projecting upwards in said shank at a
proper distance from the centre of the upright, to gain by a small motion of the
upright sufficient movement, to open or shut the switch, which movement of
the switch, is only about two inches; there must be connected to the stud pin in
the shank or arm of said upright, a rod of iron; the opposite end to that on
the stud pin should be connected to or slipped upon the round tenon on the
end of the switch lever having a pin outside of it through the tenon to prevent
the connecting rod from getting off; said connecting rod should be of suffi-
cient cient strength to open and shut the switch by pushing or pulling, which will
be alternately the movement necessarily made to open and shut said switch-
es, there should be fastened immoveably upon the top of the upright shaft a rhom-
bus, parallelogram, or diamond shaped wiper lever made of iron one inch
thick, more or less, six inches wide, more or less, in the centre, terminating in a point
at each end, a shaft passing through or into it, as near one point as may be with
safety; said iron at its widest part should be only so wide that when any fixed
article or substance passes within its point at the upright on a line with the
track rails, of the road, that it will cause said diamond shaped iron to move
or swing out, so far as to close the switch so that the carriage can pass said
switch without entering it: or should it have been the desire of the Driver to
have made a crossing, he should when approaching it, have changed the article
attached to his car, so that it should have passed upon the outside of the up-
right shaft and come in contact with the outer edge of the diamond shap-
ed iron; which being so wide in its middle, that before the iron attached to the
carriage thus moving along its side, could pass said middle, it would have opened
said switch, in which case the car would have crossed to the other track. The
said iron fixed upon the top of the upright, vibrating shaft, should be in shape
similar to a long narrow diamond, pointed at both ends, that is, at the end where
the shaft goes through and the opposite, so that in returning through said crossing,
the iron which is fixed upon the carriage to move or vibrate said diamond with,
shall not catch against it, but by its having a point the said iron can be
made to pass it upon either side at the pleasure of the driver. The said dia-
mond or rhombus shaped iron lever, will cover the top of post to which the up-
right is connected and lay horizontally above its top, the diamond shaped iron
may be open in its centre, having a rim only all round of sufficient strength which
opening will enable me to cover the top, of said post and vibrating iron, with
a cap of iron, or any thing else, extending each way beyond the post to protect it
from harm or weather. The iron shaft should also be cased about, and a trunk
be extended from it to the switch lever under ground, to protect the connecting
rod from all harm, or impediment to its movement. The regulating rod, up-
on the carriage, may be of round iron fixed to vibrate in journals extending
up from the bottom of the side rails of the carriages to the Drivers having a han-
dle

22.

6716X le upon the top standing out right angles to the upright rod; to turn it with and
there may be two notches to lay said handle into, that when in the inner notch,
it shall cause all the switches which may be passed to close, and when put
into the outer notch, it will cause them to open; so that should the driver wish
not to drop at all he places the handle in the inner notch; and should all the
switches be open when he meets them, they will all close before the wheels come
in range with them; and thus he can drop or not without leaving his seat or
horse &c. The bottom end of said regulating iron, must be bent out from the
upright part just below the bottom edge of the side rails at right angles, suffi-
cient to pass either side of the cap over the posts, as before described, then bent
down sufficient to reach at a proper distance below the cap, then in again at
right angles towards the upright, until it approaches so near that it will reach
the vibrating iron upon the upright iron shaft under the cap, but not within
three or four inches, more or less, of the upright, which is the centre of its own motion,
and then the end may be spread as wide as the edge of the vibrating diamond
shaped iron or wider, and rounded so as to slide easily along the edge, or it may
be again bent down, or up, as thought best, in lieu of spreading it at the end.
thus the iron regulator, will represent a crank with a return shank shorter
than the other upon which it revolves by three or four inches more or less, now
it may be understood, or seen, that if the Driver turns this crank out, it will
pass outside of the upright iron shaft, which is the centre of motion to the dia
mond shaped lever or wiper, this will cause the vibrating lever or wiper un-
der the cap to move out, which motion will open the switch; which is effect
ed by the Drivers, by the aforesaid handle upon the top of the upright rod, which
is the centre of motion to the crank, or if he turns the crank in, it will pass in
side of it which will move the vibrating lever the other way and thereby close
the switch; provided the centre of the crank motion on the carriage passes
directly over the upright shaft, which is the centre on which the wiper vi-
brates, and as the centre of one upright must necessarily pass over that of the
other, it will of itself be a sufficient guide for fixing their most convenient station
Or instead of the upright shaft upon the post between the tracks to open the
switches with; an iron centred a little above its middle upon a fast pin in
said post, and near to its inner edge, may be substituted; and should said
iron iron be acted upon by a spring to shut the switches with, I will call it a
spring pendulum, or if it should [be made] to act by gravity, I will then call it a pendu-
lum weight lever, the before described connecting rod between the switch lever and
the upright shaft should in this case be centred upon a fast pin, three inches, more
or less, below the centre of said spring or pendulum weight lever, the top or upper
end of said pendulums when the switch is closed, should rather lean towards said
switch it may be rounded at top and have a roller or pulley upon it at a proper
distance above the centre on which it is to vibrate or not as desired; said rol-
ler or pulley is designed is ~~designed~~ for the movements connected with the car-
riages to act upon while opening the switches to save friction, if said pendulum
should be used as a weight pendulum or lever it may be formed like the let-
ter L inverted thus ⅃ turned in towards the switch with sufficient weight; to
move or close the switch by its own gravity with safety, To move said spring or
pendulum weight lever, so as to cause the switches to open, a board or other materi-
al six inches wide, more or less, attached to and suspended by hinges or joints to the top
and outside edge of the bottom and outer rails of the carriage on both sides extend-
ing a little beyond said rails at each end, and bevelled off to a long and easy
slant from the edge on which it is centred outwards, and this outer edge of
said board, may be covered with thin hoop iron ground smooth, and said
board when not in use, may hang perpendicularly by the outsides of the rails.
A stiff knee of iron or other metal considerably out of square, may be fasten-
ed upon each end of said boards, so as to move just free of the ends of the rails.
one end of the knee projecting three or four inches, more or less from the upper
edges of said boards. To the outer end of said knees should be centred connect-
ing rods extending in to the centre of the carriage, or to either side side of the centre
if more convenient, and there connected with the upright which leads to the
reach of the Driver, said upright should have arms fast upon its lower end
extending each way from its centre five inches, more or less, at the outer ends
of which arms, stud pins should be fixed fast, on which the connecting rods
are to play). The upright having a handle or a winch to turn said upright
with. The upright being confined in boxes top and bottom just so as to move
easy when the Driver should desire to make a crossing from one track to
the other, it will be necessary for him to turn round the winch or handle of [illegible]

6716X the upright sufficiently to raise the boards attached on each side of the carriage i
in horizontal line in which position as he passes the spring or pendulum lever, th
outer edges of said boards should come in contact with the roller or pulley upon
the top end of said pendulum, and cause the top end of said pendulum lever to
move out and thereby open the switch. said boards extending the whole lengt
of the carriage, the switch will be kept open until after the hind wheels shall have
entered said switch, and as soon as the board shall have passed the pendulum lever,
the switch will immediately reclose; in which position it would be most desira
ble it should continue, as in that position, it would keep out stones, dirt, ice, or
snow; and when the switch was forced open all these articles of obstruction if about i
would slip into the path before it, and thus leave it free to return again to its form
place: if the switch was generally left open all the aforesaid articles might accumulat
with in it, and thus would necessarily have to be removed by the attention of some
person before the switch could be closed. If the carriages are not turned about at
each end of the line, it will be necessary to have the upright and crank at each en
and the same in the first mentioned case or operation. The post to which the pendu
lum is connected may be cased and capped to enclose all the irons about it excep
in the range of the top end of the pendulum lever, where the boards or other fixtures
attached to the carriages, pass in the range of which, a notch should be cut into
the post and casings under the cap, to be of sufficient depth to allow said boards
to produce all the necessary movement upon said pendulums, and yet allow the
cap above to secure it from any injury from the weather &c. A trunk as before de
scribed, in all cases leading from the post under ground to the switch, will protect
the connecting rods &c and therefore should not be omitted. The upright first described
connected to the carriage may be only of sufficient length from the crank up to
reach just above the top of the carriage rails to which they are fastened. The top
end bent out at right angles, may be six inches long, more or less, and serve as a win
or lever to turn it with; with a stud pin fast in the outer end, on which to centre a
iron rod, said rod to extend thence into the centre of the carriage, or as near it as ma
be found convenient: the said connecting rod is to be connected on its inner end
to the upright which reaches to the Driver, and in all respects be as described i
the other case, and if the carriages should not always travel one end first, i
will be necessary to have the aforesaid crank irons at the four corners of the carr
age

6716X age, and two uprights to operate them with as before set forth; or they may be fixed and formed in any other way or manner which may be preferred, or with any other Materials &c. What I claim as my invention or improvement is the application of Machinery to open and shut switches whereby the Drivers of Carriages or Superintendents of Locomotive Engines or others, without stopping or leaving their seats Carriages or horses can open and shut switches, if in order, by night or by day, without seeing them, by machinery as set forth in the above Specification or in any other way or manner James Stimpson Witnesses
George Neilson
Geo. S. Eichelberger 3548 words]